No. 701,918. Patented June 10, 1902.
W. MORRISON.
MEANS FOR PREVENTING THE DISTORTION OF SECONDARY BATTERY PLATES DURING FORMING.
(Application filed June 18, 1900.)
(No Model.)

Witnesses,
Frederick J. Goodwin

Inventor,
William Morrison
By Offield Towle Linthicum
Attys.

UNITED STATES PATENT OFFICE.

WILLIAM MORRISON, OF CHICAGO, ILLINOIS, ASSIGNOR TO THE HELIOS-UPTON COMPANY, OF CHICAGO, ILLINOIS, A CORPORATION OF NEW JERSEY.

MEANS FOR PREVENTING THE DISTORTION OF SECONDARY-BATTERY PLATES DURING FORMING.

SPECIFICATION forming part of Letters Patent No. 701,918, dated June 10, 1902.

Application filed June 18, 1900. Serial No. 20,659. (No model.)

*To all whom it may concern:*

Be it known that I, WILLIAM MORRISON, a citizen of the United States, residing at Chicago, in the county of Cook and State of Illinois, have invented certain new and useful Improvements in Means for Preventing Distortion of Secondary-Battery Plates, of which the following is a specification.

This invention relates to means for preventing distortion to battery-plates during the process of forming said plates by electrochemical action, and has for its object to permit the use of battery-plates which are light and thin, and therefore economical, and to prevent the buckling or distortion of such plates during the process of forming them.

To these ends the invention consists in certain novel features, which I will now proceed to describe and will then particularly point out in the claim.

Figure 1:
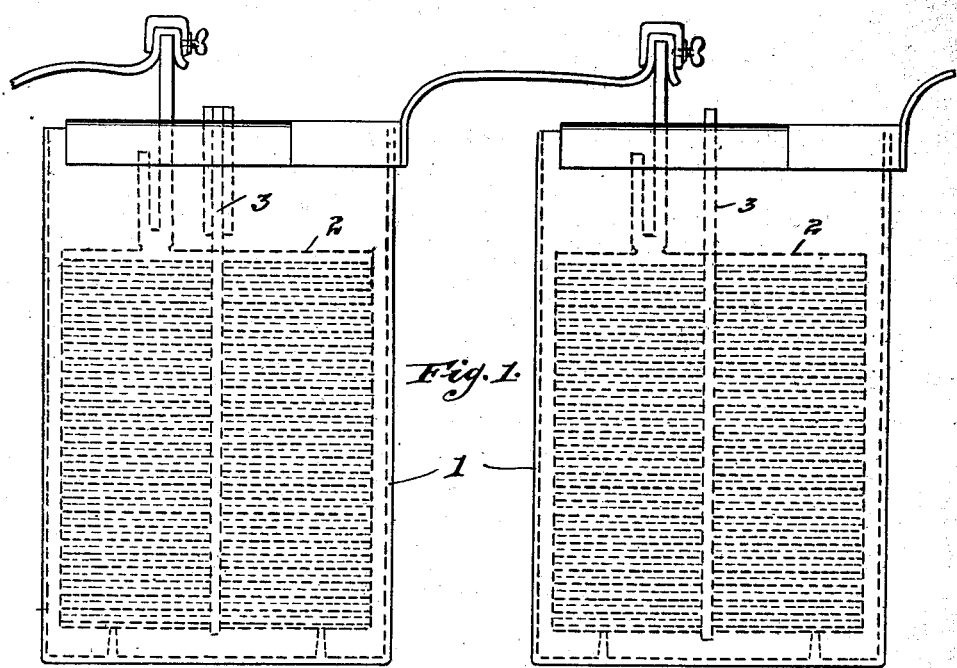
Figure 2:
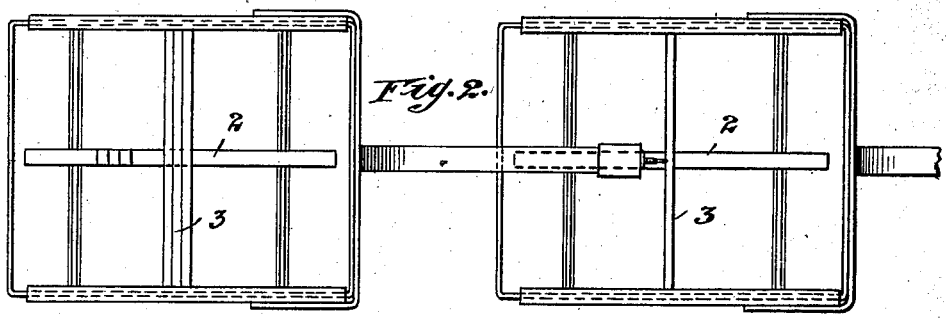
Figures 3, 4:
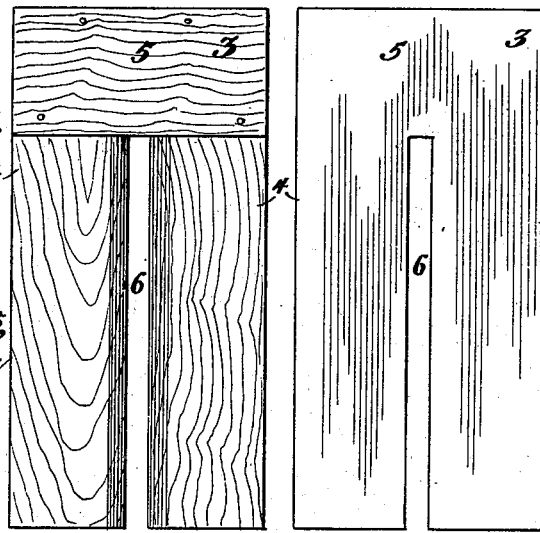

In the accompanying drawings, Figure 1 is a side elevation of a structure embodying my invention. Fig. 2 is a plan view of the same. Fig. 3 is an elevation of a bridge-piece or support embodying my invention in one form, and Fig. 4 is a similar view of a modified form.

My present invention is adapted for use in connection with battery-plates constructed in accordance with an application filed by me of even date herewith, and is particularly designed for use in connection with such plates during the process of forming them by electrochemical action. The plates in question are much thinner than battery-plates as ordinarily constructed, and are therefore liable to buckle or become distorted during the forming process, owing to the changing of the solid lead of which they are composed into spongy or granular metallic lead, thereby bringing a considerable strain upon the plates. Such plates are grooved, as indicated in dotted lines in Fig. 1, and the spongy lead as it forms in the grooves tends to distort the plates.

In the accompanying drawings, 1 indicates a suitable cell or receptacle containing a suitable acid-bath in which the forming process is carried on by the passage of an electric current through the plate, which is indicated at 2, said cell forming one electrode of the electric charging-circuit. In order to prevent the buckling or distortion of the plate, I employ a bridge-piece or support, (indicated as a whole by the reference-numeral 3,) which support comprises two rigid arms 4, which are rigidly connected at their upper ends by a cross-piece 5 and which have between them a space 6, into which the plate 2 fits. The plate is thus firmly supported laterally on each side, the bridge-piece being of sufficient length to extend from top to bottom of the plate and serving to prevent buckling or lateral distortion thereof. The bridge-piece also extends above the plate and above the surface of the acid-bath, thus providing a convenient means for manipulating the same. In its preferred form said bridge-piece extends across the cell 1, from side to side thereof, and has a bearing against or connection with the side walls of the cell, so that the cell and bridge-piece mutually brace and support each other, as well as the plate.

The bridge-piece may be of any suitable material and construction, and in Fig. 3 and in the left-hand cells of Figs. 1 and 2 I have shown a bridge-piece constructed of wood and suitably braced by cross-pieces at the top, while in Fig. 4 and the right-hand cells of Figs. 1 and 2 I have shown the bridge-piece as constructed of a single piece of any suitable material, such as hard rubber. It will be seen that by the employment of these bridge-pieces or lateral supports I am enabled to form thin battery-plates by electrochemical action without causing distortion or buckling of the plates.

It is obvious that my invention may be modified in its details without departing from the principle thereof. For instance, a greater number of bridge-pieces or supports than one may be employed with each plate, and the form and mode of attachment of the lateral supports may be varied—for instance, by making them integral with the walls of the cell 1. I therefore do not wish to be understood as limiting myself to the precise details hereinbefore described, and shown in the accompanying drawings. Moreover, although the device is particularly adapted for use with thin battery-plates, it is also a great advantage in connection with battery-plates of the usual or greater thickness, since it not only prevents any possible distortion, but also centers the plate in such a way as to insure equal forming on both sides thereof, and this latter advantageous result is also obtained when the device is used in connection with thin plates.

I claim—

The combination, with a battery-cell forming one electrode of an electric charging-circuit and a battery-plate, of a bridge-piece, formed of a board or slab of a width equal to the internal width of the cell and provided with a central slot extending from one end inwardly a distance equal to the vertical depth of the battery-plate and adapted to receive and fit closely upon the latter; the outer edges of said bridge-piece being adapted to bear against the walls of the cell, while the inner edges bear against the sides of the plate, substantially as described.

WILLIAM MORRISON.

Witnesses:
FREDERICK C. GOODWIN,
IRVINE MILLER.